United States Patent
Gylfason et al.

(10) Patent No.: US 6,560,613 B1
(45) Date of Patent: May 6, 2003

(54) DISAMBIGUATING FILE DESCRIPTORS

(75) Inventors: Snorri Gylfason, Mountain View, CA (US); Xun Wilson Huang, Mountain View, CA (US); Rosen Sharma, Mountain View, CA (US)

(73) Assignee: Ensim Corporation, Sunnyvale, CA (US)

( * ) Notice: Subject to any disclaimer, the term of this patent is extended or adjusted under 35 U.S.C. 154(b) by 0 days.

(21) Appl. No.: 09/500,212

(22) Filed: Feb. 8, 2000

(51) Int. Cl.⁷ ..................... G06F 12/00; G06F 17/30
(52) U.S. Cl. .............. 707/200; 707/9; 707/10
(58) Field of Search ............. 707/9, 10, 200, 707/1, 140

(56) References Cited

U.S. PATENT DOCUMENTS

| | | | |
|---|---|---|---|
| 3,377,624 A | 4/1968 | Nelson et al. ............ 711/152 |
| 4,177,510 A | 12/1979 | Appell et al. ............ 364/200 |
| 5,212,793 A | 5/1993 | Donica et al. | |
| 5,249,290 A | 9/1993 | Heizer | |
| 5,263,147 A | 11/1993 | Francisco et al. ......... 395/425 |
| 5,437,032 A | 7/1995 | Wolf et al. | |
| 5,584,023 A | * 12/1996 | Hsu ..................... 707/204 |
| 5,603,020 A | * 2/1997 | Hashimoto et al. ........ 707/200 |
| 5,636,371 A | 6/1997 | Wu ..................... 395/500 |
| 5,692,047 A | 11/1997 | McManis ................. 380/4 |
| 5,706,097 A | * 1/1998 | Schelling et al. ......... 345/723 |
| 5,706,453 A | 1/1998 | Cheng et al. | |
| 5,708,774 A | 1/1998 | Boden | |
| 5,761,477 A | 6/1998 | Wahbe et al. ......... 395/406 A |
| 5,781,550 A | 7/1998 | Templin et al. .......... 370/401 |
| 5,809,527 A | * 9/1998 | Cooper et al. ........... 707/200 |
| 5,828,893 A | 10/1998 | Weid et al. ............. 395/800 |
| 5,838,916 A | * 11/1998 | Domenikos et al. ....... 345/753 |
| 5,842,002 A | 11/1998 | Schnurer et al. ......... 395/500 |
| 5,845,129 A | 12/1998 | Wendorf et al. .......... 395/726 |
| 5,860,004 A | * 1/1999 | Fowlow et al. .......... 717/109 |
| 5,913,024 A | 6/1999 | Green et al. ............ 395/186 |
| 5,915,085 A | 6/1999 | Koved .................. 395/186 |
| 5,918,018 A | 6/1999 | Gooderum et al. ..... 395/200.55 |
| 5,937,159 A | * 8/1999 | Meyers et al. ........... 713/201 |

(List continued on next page.)

OTHER PUBLICATIONS

Keshav, S., An Engineering Approach to Computer Networking: ATM Networks, the Internet, and the Telephone Network, Reading, MA, Addison–Wesley, 1997, pp. vii–xi, 85–115, 209–355, 395–444.

(List continued on next page.)

Primary Examiner—John Breene
Assistant Examiner—Leslie Wong
(74) Attorney, Agent, or Firm—Fenwick & West LLP

(57) ABSTRACT

File descriptors associated with specific file types are disambiguated from other file descriptors by maintaining and examining an indicator table containing indicators concerning file descriptors associated with a specific, desired file type. System calls that establish a descriptor of the specific, desired type are intercepted, and an indicator concerning the established file descriptor is added to the indicator table. To keep the indicator table current, system calls that make a copy of a file descriptor or that delete a file descriptor are intercepted. If a file descriptor associated with the desired type is copied or deleted, the indicator table is updated. Therefore, the indicator table preferably includes indicators concerning all file descriptors associated with files of the specific desired type. The indicator table is examined to determine whether or not a specific file descriptor is of the desired type. In one embodiment, system calls that access files via file descriptors are intercepted, and the system call wrapper examines the indicator table to determine whether the file being accessed is of the desired type. Only if the file is of the desired type does the system call wrapper continues to execute. If the file is not of the desired type, the default system call is made. Thus, system calls that access files are selectively intercepted based upon file type.

21 Claims, 16 Drawing Sheets

U.S. PATENT DOCUMENTS

| | | | |
|---|---|---|---|
| 5,956,481 A | | 9/1999 | Walsh et al. ................. 395/186 |
| 6,023,721 A | | 2/2000 | Cummings ................... 709/201 |
| 6,065,118 A | | 5/2000 | Bull et al. .................... 713/200 |
| 6,086,623 A | * | 7/2000 | Broome et al. ................ 703/26 |
| 6,108,759 A | * | 8/2000 | Orcutt et al. ................ 711/112 |
| 6,167,520 A | | 12/2000 | Touboul ...................... 713/200 |
| 6,192,389 B1 | * | 2/2001 | Ault et al. ................... 709/101 |
| 6,192,512 B1 | | 2/2001 | Chess ............................. 717/5 |

OTHER PUBLICATIONS

Stevens, R. W., UNIX Network Programming vol. 1 Networking APIs: Sockets and XTI, Upper Saddle River, NJ, Prentice Hall, 1998, pp. v–xiv, 29–53, 85–110, 727–760.

Tanenbaum, A. S. and Woodhull, A. S., Operating Systems: Design and Implementation, Upper Saddle River, NJ, Prentice Hall, 1997, pp. vii–xiv, 1–46, 401–454.

Rubini, A., LINUX Device Drivers, Sebastopol, CA, O'Reilly & Associates, Inc., 1998, pp. v–x, 13–40.

Goyal, P., et al., "A Hierarchical CPU Scheduler for Multimedia Operating Systems," *Proceedings of the Second Symposium on Operating Systems Design and Implementations (OSDI'96)*, Seattle, WA, Oct. 1996, 15 pages.

Laurie, B. and Laurie, P., *Apache The Definitive Guide*, Sebastopol, CA, O'Reilly & Associates, Inc., Feb. 1999, pp. v–viii, 43–74.

Aho, A. V. and Ullman J. D., Principles of Complier Design, Reading, MA, 1977, pp. vii–x, 359–362, 519–522.

Jonsson, J., "Exploring the Importance of Preprocessing Operations in Real–Time Multiprocessor Scheduling," *Proc. of the IEEE Real–Time Systems Symposium—Work–in–Progress session*, San Francisco, CA, Dec. 4, 1997, pp. 31–34.

Rusling, D. A., Processes, [online], [retrieved on Dec. 7, 1999]. Retrieved from the Internet: <URL: http://www.cebaf.gov/~saw/linux/tlk–html/node44.html>.

Rusling, D. A., Linux Processes, [online], [retrieved on Dec. 7, 1999]. Retrieved from the Internet: <URL:http://www-.cebaf.gov/~saw/linux/tlk–html/node45.html>.

Rusling, D. A., Linux Processes, [online], [retrieved on Dec. 7, 1999]. Retrieved from the Internet: <URL: http://www-.cebaf.gov/~saw/linux/tlk–htm/node46.html>.

Rusling, D. A., Scheduling [online], [retrieved on Dec. 7, 1999]. Retrieved from the Internet: <URL: http://www.cebaf.gov/~saw/linux/tlk–html/node47.html>.

Rusling, D. A., Scheduling in Multiprocessor Systems, [online], [retrieved on Dec. 7, 1999]. Retrieved from the Internet: <URL: http://www.cebaf.gov/~saw/linux/tlk–html/node48.html>.

Rusling, D. A., Files, [online], [retrieved on Dec. 7, 1999]. Retrieved from the Internet: >URL: http://ww.cebaf.gov/~saw/linux/tlk–html/node49.html>.

Plummer, D. C., An Ethernet Address Resolution Protocol—or—Converting Network Protocol Addresses to 48.bit Ethernet Address for Transmission on Ethernet Hardware, Nov. 1982, [online], [retrieved on Jan. 17, 2000]. Retrieved form the Internet: <URL: http://www.msg.net/kadow/answers/extras/rfc/rfc826.txt>.

Huang, X. W. et al., "The Entrapid Protocol Development Environment," *Proceedings of IEEE Infocom'99*, Mar. 1999, nine pages.

Duffield, N.G., et al., "A Flexible Model for Resource Management in Virtual Private Networks," *Computer Communication Review Conference, Computer Communication*, ACM SIGCOMM '99 Conference, Cambridge, MA, Aug. 30, 1999–Sep. 3, 1999, pp. 95–108.

Campbell, A. T. and Keshav, S., "Quality of Service in Distributed Systems," *Computer Communications 21*, 1998, pp. 291–293.

Bach, M. J., *The Design of the Unix® Operating System*, New Delhi, Prentice–Hall of India, 1989, pp. v–x, 19–37.

McDougall, R., et al., *Resource Management*, Upper Saddle River, NJ, Prentice Hall, 1999, pp. iii–xix, 135–191.

Rijinghani, A., RFC 1624, May 1994, [online], [retrieved Feb. 2, 2000]. retrieved from the internet: <URL:http://www.faqs.org/rfc1624.html>.

Mallory, T and Kullberg, A., RFC 1141, Jan. 1990 [online], [retrieved Feb. 2, 2000]. retrieved from the Internet: <URL:http://www.faqs.org/rfcs/rdc1141.html>.

Egevang, K. and Francis P., RFC 1631, May 1994 [online], [retrieved Feb. 2, 2000]. retrieved from the Internet: <URL: http://www.faqs.org/rfcs/rfc1631.html>.

Evans, D. and Twyman, A., "Flexible Policy–Directed Code Safety," Proc. of 1999 IEEE Symposium on Security and Privacy, Oakland, CA, May 9–12, 1999, pp. 1–14.

Fraser, T. et al., "Hardening COTS Software with Generic Software Wrappers," Proc. of 1999 IEEE Symposium on Security and Privacy, 1999, 15 pages.

Goldberg, I. et al., "A Secure Environment For Untrusted Helper Applications (Confining the Wily Hacker)," Proc. of the Sixthe USENIX UNIX Security Symposium, San Jose, CA, Jul. 1996, 14 pages.

Goldberg, R. P., "Survey of Virtual Machine Research," IEEE Computer, Jun. 1974, pp. 34–45.

Pandey, R. and Hashii, B., "Proving Fine–Grained Access Control For Mobile Programs Through Binary Editing," Technical Report TR98 08, University of California, Davis, CA, 1998, pp. 1–22.

Ritchie, D. M., "The Evolution of the Unix Time–Sharing System," AT&T Bell Laboratories Technical Journal 63, No. 6, Part 2, Oct. 1984, (originally presented 1979), 11 pages.

Saltzer, J., H. and Schroeder, M. D., The Protection of Information in Computer Systems, [online], 1973, [retrieved on Apr. 2, 2002]. Retrieved from the Internet: <URL: http://www.cs.virginia.edu~evans/cs551/saltzer/>.

Wahbe, R., et al., "Efficient Software–Based Fault Isolation," Proc. of the Symposium on Operating System Principles, 1993, 14 pages.

Goyal, P. et al., "Start–time Fair Queuing: A Scheduling Algorithm for Integrated Services Packet Switching Networks," Proceedings of ACM SIGCOMM '96, San Francisco, CA, Aug. 1996, 14 pages.

Jánosi, T., "Notes on 'Hierarchical CPU Scheduler for Multimedia Operating Systems' by Pawan Goyal, Xingang Guo and Harrick Vin," [online], [retrieved on May 8,2000]. Retrieved from the internet: <URL:http://cs.cornell.edu/Info/Courses/Spring–97/CS614/goy.html>.

Goyal, P., "Packet Scheduling Algorithms for Integrated Services Networks," PhD Dissertation, University of Texas, Austin, TX, Aug. 1997.

Pending United States patent application entitled "Providing Quality of Service Guarantees to Virtual Hosts," ser. No. 09/452,286, filing date Nov. 30, 1999.

Pending United States patent application entitled "Selective Interception of System Calls," serial No. 09/499,098, filing date Feb. 4, 2000.

Pending United States patent application entitled "Dynamic Scheduling of Task Streams in a Multiple–Resource System to Ensure Task Stream Quality of Service," serial No. 09/498,450, filing date Feb. 4, 2000.

Boehm, B., "Managing Software Producttivity and Reuse," IEEE Computer, vol. 32, No. 9, Sep. 1999, 3 pages.

Corbato, F. J. et al. "An Experimental Timesharing System," Proceedings of the American Federation Of Information Processing Societies Spring Joint Computer Conference, San Francisco, CA, May 1–3, 1962, pp. 335–344.

Deutsch, P. and Grant, C.A., "A Flexible Measurement Tool for Software Systems," Information Processing 71 (Proc. of the IFIP Congress), 1971, pp. 320–326.

Edjlali, G., et al., "History–based Access Control for Mobile Code," Fifth ACM Conference on Computer and Communication Security, Nov. 3–5, 1998, 19 pages.

Erlingsson, U. and Schneider, F. B., "SASI Enforcement of Security Policies: A Retrospective," Proc. New Security Paradigms Workshop, Apr. 2, 1999, pp. 1–17.

* cited by examiner

DISAMBIGUATING FILE DESCRIPTORS

BACKGROUND

Field of Invention

The present invention relates generally to disambiguating file types on a computer system, and specifically to disambiguating communication channel file descriptors from file descriptors that that are associated with files stored on physical media.

BACKGROUND OF INVENTION

Operating systems such as UNIX® and Microsoft WINDOWS NT® are widely utilized in commercial computing systems. Among their many commercial uses, these operating systems are commonly deployed on Internet and other network server computers. With the popularity and success of the Internet, server computer operating systems are currently of great commercial importance.

Frequently, it is desirable to intercept system calls that pertain to accessing files. Although operating systems include various internal resources for accessing a file system, it is often desirable to customize or extend operating system functionality for a particular use. Such customization allows a computer programmer, a network administrator, or a webmaster to utilize the operating system in a specific manner beyond the default system capabilities provided by the manufacturer of the operating system. The interception of system calls is one such method of extending and expanding operating system functionality.

A system call is a subroutine, the object code of which is located in an operating system, such that the subroutine can be called by processes executing under the control of the operating system. When executed, a system call performs some system operation, such as the access of a system hardware or software resource. Examples of operations executed by system calls include reading data from a file, opening a network communication channel, and allocating computer memory to a specific process. Application programs (processes) executing under the control of the operating system make a system call in order to bring about the performance of these and other system operations.

System calls are accessed by the operating system, using a system call vector table. A system call vector table is an area in operating system address space. A system call vector table stores pointers to the actual executable code of the system calls. In order to make a system call, arguments are programmatically loaded into specific registers of the central processing unit of the computer on which the operating system is executing. One of these arguments identifies the specific system call that is being made. This argument is typically in the form of a number that is an offset into the system call vector table. The other loaded arguments include parameters to be passed to the system call.

Once the arguments have been loaded, a software interrupt is generated, signaling to the operating system that a process is requesting execution of a system call. The operating system reads the registers, and executes the requested system call with the specified parameters. The system call executes and performs the desired functionality. If the system call generates a return value, it places the generated return value (or a pointer thereto) in a pre-designated register where it can be accessed by the calling process.

In order to intercept a system call, a pointer in the system call vector table to the system call is replaced with a pointer to alternative object code to be executed instead of the system call. Then, when the operating system reads the system call vector table in response to the system call being requested, the operating system will read the pointer to the alternative object code, and the alternative object code will execute instead of the system call. The alternative object code is typically known as a system call wrapper.

The interception of system calls providing access to the file system is useful to extend and customize operating system functionality. For example, the interception of system calls can be used to manipulate operating system access privileges to provide security beyond that which is provided by the operating system. Through the interception of system calls that provide access to the file system, processes can be prevented from deleting, modifying, creating, or even reading files. This is desirable, for example, when a user wishes to remotely execute a program residing on a web server, but does not want the remote program to be able to read or alter private data on the user's computer. Today, Java applets are commonly employed to provide such security. However, many programs that users wish to remotely execute are written in languages other than Java. System call interception has the potential to allow the safe execution of programs written in all languages.

The interception of system calls is known today, although it is an advanced systems programming technique. Nonetheless, a serious shortcoming limits the usefulness of intercepting system calls that provide access to the file system. That shortcoming is the inability to disambiguate between a file descriptor that is associated with a file stored on media (e.g. hard disk, optical disk, random access memory) and a file descriptor that is associated with a communication channel.

Many computer operating systems utilize file descriptors to provide access to file systems. Under such operating systems, a file is created by making a system call that creates a file and returns a file descriptor that is associated with the newly created file. Subsequently, the file is accessed via the file descriptor. Examples of file access operations include reading from a file, writing to a file, closing a file, and deleting a file. Such operations are typically conducted by making a designated system call, and passing the system call the file descriptor that is associated with the file being accessed.

Many commercially popular operating systems such as UNIX® and Microsoft WINDOWS NT® treat communication channels as files. In such an operating system, when a process makes a system call in order to establish a communication channel, the operating system returns a file descriptor. The communication channel is subsequently accessed via the file descriptor, in a similar manner as a file stored on media.

Commonly, the same system calls are made to perform the same access operations on both files stored on media and on communication channels. For example, under the UNIX® operating system, a read system call can be made in order to read data from either a file stored on media or from a communication channel. The system call itself has no information concerning with what file type a file descriptor is associated, that is whether the file descriptor refers to a communication channel or a file stored on media. The system call simply executes instructions to access a file in a specific manner via a file descriptor. For example, the read system call executes instructions to copy a specific number of bytes from a file to a buffer in memory. The read system call does not distinguish between a file on media and a communication channel, and in fact has no indication concerning from what file type it is reading data.

Because the system calls that access files via file descriptors do not distinguish between a file on media and a communication channel, a system call wrapper that executes when such a system call is intercepted has no mechanism for so distinguishing. For example, if the read system call is intercepted, the system call wrapper will execute whenever any process makes the system call to read data from any type of file. Thus, the system call wrapper will execute whenever a process attempts to read data from a file stored on media and also whenever a process attempts to read data from a communication channel.

Communication channels and files stored on media are inherently different, despite the fact that both are accessed via file descriptors. It is often desirable to intercept system calls that access a file stored on media, but not to intercept system calls that access a communication channel. Likewise, it is often desirable to intercept system calls that access a communication channel, but not to intercept system calls that access a file stored on media. Specifically, in the example given above concerning intercepting system calls to prevent processes from manipulating files, it is desirable only to intercept system calls that access files stored on media. The desired result is to prevent access to files stored on media, but not to prevent access to communication channels. For example, it may be desirable to prevent write access to the file system of a specific client computer. At the same time, it may be undesirable to prevent write access to the communication channels of the client computer, because it would be desirable for the computer to be able to receive communication responses from web servers. However, intercepting every write system call and executing a system call wrapper in its place to prevent write access would prevent write access to both communication channels and to files stored on media.

Likewise, it is often desirable to intercept system calls that pertain to access of communication channels, but not to intercept system calls that pertain to access of files stored on media. For example, it may be desirable to disallow remote communication requests made to a certain computer, but at the same time desirable to allow local access to files stored on media of the computer. Again, because the same system call is used to access communication channels and files stored on media, the one can not be prevented and yet the other allowed.

It is further desirable to be able to disambiguate file descriptors generally. Under some operating systems, entities other than communication channels and files stored on media are treated as files, and hence accessed via file descriptors. For example, under the UNIX® operating system, hardware devices are designated by file descriptors. For the same reasons that it is desirable to disambiguate communication channel file descriptors from file descriptors that are associated with files stored on media, it is further desirable to be able to disambiguate file descriptors that are associated with any type of file from those that are associated with any other type.

Accordingly, what is needed is a method to disambiguate file descriptors generally, and specifically to disambiguate file descriptors that that are associated with files stored on media from file descriptors that that are associated with communication channels. This would allow for the selective interception of system calls that access one type of file or another.

SUMMARY OF INVENTION

The present invention allows disambiguation of file descriptors generally, and disambiguation of communication channel file descriptors from file descriptors that are associated with files stored on media specifically. In order to so disambiguate, indicators concerning file descriptors that are associated with a specific file type are stored. When file descriptors are subsequently utilized to access files, the indicators are examined in order to determine the associated file type.

In one preferred embodiment, the indicators concerning communication channel file descriptors are stored in an indicator table. In order to maintain the table, system calls that establish a communication channel are intercepted. Pointers in the system call vector table to system calls that establish a communication channel are replaced with pointers to alternative object code (a system call wrapper), such that when the system calls are made, the system call wrapper executes instead. The system call wrapper first executes the system call, to allow the communication channel to be established. The system call wrapper then stores an indicator that the file descriptor returned by the system call is associated with a communication channel. Preferably, this indicator is stored in a table in operating system address space. In alternative embodiments indicators are stored in other data structures (for example a linked list) in either operating system address space or user address space as desired.

In order to keep the table complete, in one embodiment system calls that copy a file, copy a file descriptor, or copy an entire file descriptor table are intercepted. As with the interception of system calls that establish a communication channel, pointers in the system call vector table to system calls to be intercepted are replaced with pointers to a system call wrapper. The system call wrapper checks the stored indicators to determine whether any file descriptors to be copied are associated with a communication channel. If so, the system call wrapper first executes the system call, to allow the copy to be created. The system call wrapper then stores, for each created copy of a file descriptor that is associated with a communication channel, an indicator that the copy of the file descriptor is associated with a communication channel. If no file or file descriptor to be copied is associated with a communication channel, the system call wrapper simply makes the system call such that execution control returns to the calling process after the system call executes.

Additionally, in order to keep the table current, in one embodiment system calls that delete file descriptors are intercepted. Again, pointers in the system call vector table to system calls that delete file descriptors are replaced with pointers to a system call wrapper. The system call wrapper checks the stored indicators to determine whether a file descriptor to be deleted is associated with a communication channel. If so, the system call wrapper first executes the system call, to allow the file descriptor to be deleted. The system call wrapper then deletes the indicator that the file descriptor is associated with a communication channel. This is desirable because the file descriptor no longer exists, so the association is no longer accurate or relevant. If no file descriptor to be deleted is associated with a communication channel, the system call wrapper simply makes the system call such that execution control returns to the calling process after the system call executes.

To summarize, system calls that create a communication channel are intercepted, as are system calls that either copy or delete existing file descriptors. The system call wrapper that executes when these system calls are intercepted maintains a table of stored indicators concerning communication channel file descriptors. Thus, the table preferably includes an indicator for every existing communication channel file descriptor. The stored indicators can subsequently be examined by any process to disambiguate file descriptors. For example, because communication channel file descriptors are indicated in the table, any process can examine the table to determine whether or not a given file descriptor is a communication channel file descriptor. In an operating system in which every file descriptor either is a communication channel file descriptor or a descriptor of a file stored on media, the table of indicators concerning file descriptors can also be examined to determine if a given file descriptor is associated with a file stored on media. This is true because if the table does not contain an indicator for a given file descriptor, that file descriptor is not a communication channel file descriptor, and therefore is a descriptor of a file stored on media.

In another preferred embodiment of the present invention, system calls that create a file that is stored on media are intercepted, as opposed to system calls that establish a communication channel. Thus, the table of indicators comprises indicators of file descriptors that are associated with files stored on media. As with the previously described embodiment, system calls that copy or delete file descriptors are also intercepted, and an indicator table is maintained. The indicator table is then examined to determine whether or not a file descriptor is associated with a file stored on media.

Because the present invention allows any process to disambiguate file descriptors, the present invention can be utilized to selectively intercept system calls that access a file stored on media. Likewise, the present invention can be utilized to selectively intercept system calls that access a communication channel.

In order to selectively intercept system calls that access files, system calls that access a file via a file descriptor are initially intercepted. The system call wrapper that executes when such system calls are intercepted proceeds to examine the stored indicator table to determine the type of file with which the file descriptor is associated. If the file descriptor is associated with a desired file type, the system call wrapper continues to execute. Otherwise, the default system call is made and then execution control returns to the calling process.

For example, suppose it is desirable only to intercept system calls that pertain to communication channels, but not to intercept system calls that pertain to files stored on media. When a read system call is made, the system call wrapper examines the indicator table to determine whether the file descriptor from which the system call is to read data is associated with a communication channel. If so, the system call wrapper proceeds to execute as desired. If the file descriptor is not associated with a communication channel, the default system call is executed, such that execution control is returned to the calling process after the system call terminates.

It will be readily apparent to one skilled in the art that the present invention can be utilized to disambiguate any type of file descriptor. Thus, although disambiguating communication channel file descriptors from file descriptors that are associated with files stored on media is one function of the present invention, the present invention is by no means so limited. For example, the UNIX® operating system treats hardware devices as files, as noted above. Under UNIX®, the present invention can be utilized to create and maintain an indicator table concerning hardware device file descriptors. Then, the indicator table can be utilized to disambiguate hardware device file descriptors from other kinds.

It is to be understood that disambiguation by file type can be conducted at varying levels of specificity (in other words, the term "file type" can be defined as broadly or narrowly as desired). For example, in one embodiment file descriptors that are associated with files stored on media are disambiguated from communication channel file descriptors, as described above. In another embodiment, file descriptors that are associated with files stored on media in a specific directory are disambiguated from files descriptors that are associated with other files stored on media. In yet another embodiment, file descriptors concerning files with specific attributes, such as system or read-only, are disambiguated from file descriptors concerning files without those attributes. In fact, files descriptors concerning a specific file can even be disambiguated from all other file descriptors.

It will also be apparent that the present invention can be utilized to disambiguate file descriptors by any process. Although file descriptor disambiguation by a system call wrapper to allow for selective system call interception is an embodiment of the present invention, it is by no means the only embodiment. The examination of the indicator table by any process for the purpose of file descriptor disambiguation is within the scope of the present invention. For example, suppose a user process executing on a web server has permission to write to communication channels of the server in order to make communication requests, but does not have permission to write to the file system of the web server. It would be both desirable and within the scope of the present invention for the process to examine the indicator table to determine if a specific file descriptor is or is not associated with a communication channel.

Further, one skilled in the art will readily comprehend that many combinations of indicator storage and examination to disambiguate file descriptors are possible. All such combinations are within the scope of the present invention. For example, to make a binary distinction between two types of file descriptors (for example, communication channel file descriptors and those that are associated with files stored on media), indicators concerning either type of file descriptor may be stored and examined to is determine if any file descriptor on the system is of one type or the other. If the indicator table comprises indicators concerning communication channel file descriptors, the table could be examined to determine if any given file descriptor is associated with a communication channel, or to determine if the file descriptor is associated with a file stored on media. Likewise, if the indicator table comprises indicators concerning file descriptors that are associated with files stored on media, the table could be examined to determine if any given file descriptor is associated with a file stored on media, or to determine if the file descriptor is associated with a communication channel.

Under an operating system that allows more than two types of file descriptors (for example, communication channel file descriptors, file descriptors that are associated with files stored on media, and hardware device file descriptors), an indicator table concerning any given file descriptor type can be maintained and subsequently examined to determine if a specific file descriptor is or is not associated with a file of the given type. Alternatively, an indicator table concerning multiple file descriptor types (or multiple indicator tables each concerning one or more types) could be maintained and examined to disambiguate file descriptors. All such embodiments are within the scope of the present invention.

DETAILED DESCRIPTION OF THE PREFERRED EMBODIMENTS

I. System Overview

Figure 1:
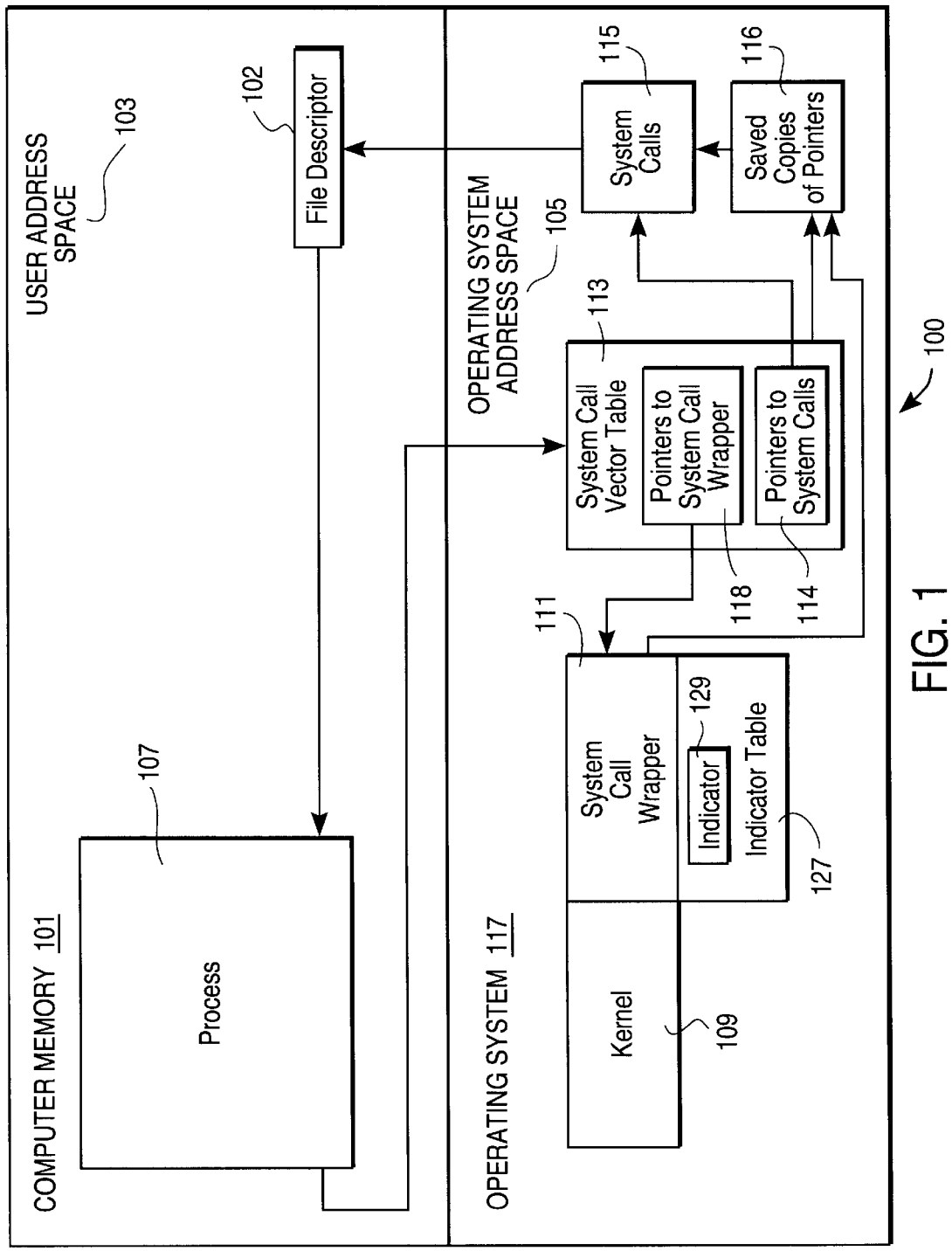
FIG. 1 is a high level block diagram illustrating a system for disambiguating file descriptors according to one embodiment of the present invention.

FIG. 1 illustrates a system 100 for disambiguating file descriptors 102 according to one embodiment of the present invention. A computer memory 101 includes user address space 103 and operating system address space 105. A process 107 executes in user address space 103. Although FIG. 1 illustrates only a single process 107 executing in user address space 103, it is to be understood that within a given computer memory 101, multiple processes 107 can execute simultaneously.

In order to disambiguate file descriptors 102, certain system calls 115 are intercepted. The interception of specific system calls 115 in order to disambiguate file descriptors 102 is described in detail below. In order to intercept system calls 115, techniques known in the art are utilized to insert a system call wrapper 111 into the operating system 117. In a preferred embodiment, a system call wrapper 111 is dynamically loaded into the operating system kernel 109, while the kernel 109 is active. The system call wrapper 111 is preferably in the form of object code, the functional features of which are described in detail below. Preferably, a single system call wrapper 111 that includes all of the code object described below is loaded into the operating system kernel 109. In alternative embodiments, multiple system calls wrappers 111 are loaded, each system call wrapper 111 including a subset of the object code.

Pointers 114 to system calls 115 are located in an operating system system call vector table 113. It is to be understood that the term "system call vector table" as used herein denotes an area in operating system address space 105 in which there are stored the addresses of system calls. In the UNIX® operating system, this part of the operating system is called the "system call vector table," and that term is used in this specification. Other operating systems employ different terminology to denote the same system component. A system call vector table by any other name is still within the scope of the present invention.

A copy 116 is made of a pointer 114 to each system call 115 to be intercepted. These copies 116 of pointers 114 are preferably stored in operating system address space 105, but in an alternative embodiment are stored in user address space 103. Once the copies 116 have been made and saved, the pointers 114 in the system call vector table 113 to the system calls 115 to be intercepted are replaced with pointers 118 to the system call wrapper 111, such that when a system call 115 to be intercepted is made, the system call wrapper 111 executes instead. In one embodiment of the present invention, this copying, storing, and replacing of pointers is performed by the system call wrapper 111. In other embodiments, copying, storing, and replacing of pointers is performed by a pointer management module executing in either operating system address space 105 or user address space 103 as desired. The pointer management module can either be a stand alone program, or a component of a larger application program as desired.

Executing alternative code when a system call 115 is made comprises intercepting the system call 115. The steps of inserting a system call wrapper 111 into the operating system 117, making a copy 116 of an operating system pointer 114 to a system call 115, and replacing the operating system pointer 114 with a pointer 118 to the system call wrapper 111 facilitate interception of a system call 115. When a system call 115 to be intercepted is made, the operating system 117 uses the pointer 118 in the system call vector table 113 to the system call wrapper 111 to execute the system call wrapper 111.

It is to be understood that in the present invention, not all system calls 115 are intercepted. Only pointers 114 to system calls 115 to be intercepted are replaced with pointers 118 to the system call wrapper 111. Pointers 114 to system calls 115 which are not to be intercepted are not replaced. Thus, when a non-intercepted system call 115 is made, the system call 115 executes, not the system call wrapper 111.

Preferably, a data structure for storing indicators 129 is inserted into the operating system 117. In one embodiment, the data structure is an indicator table 127, but in other embodiments other data structures are utilized, for example a linked list. In a preferred embodiment, the indicator table 127 (or other data structure) is dynamically loaded into the operating system kernel 109, while the kernel 109 is active. In one alternative embodiment, the indicator table 127 is stored in user address space 103. Regardless, the system call wrapper 111 maintains the indicator table 127 so that the indicator table 127 includes, for each file descriptor 102 that is associated with a specific file type, an indicator 129 of the association. The maintenance and use of the indicator table 127 is discussed in detail below.

Processes 107 execute in user address space 103 under control of the operating system 117, and make system calls 115. When a process makes a system call 115 that is to be intercepted, the system call wrapper 111 executes.

II. Disambiguating Communication Channel File Descriptions

Figure 2:
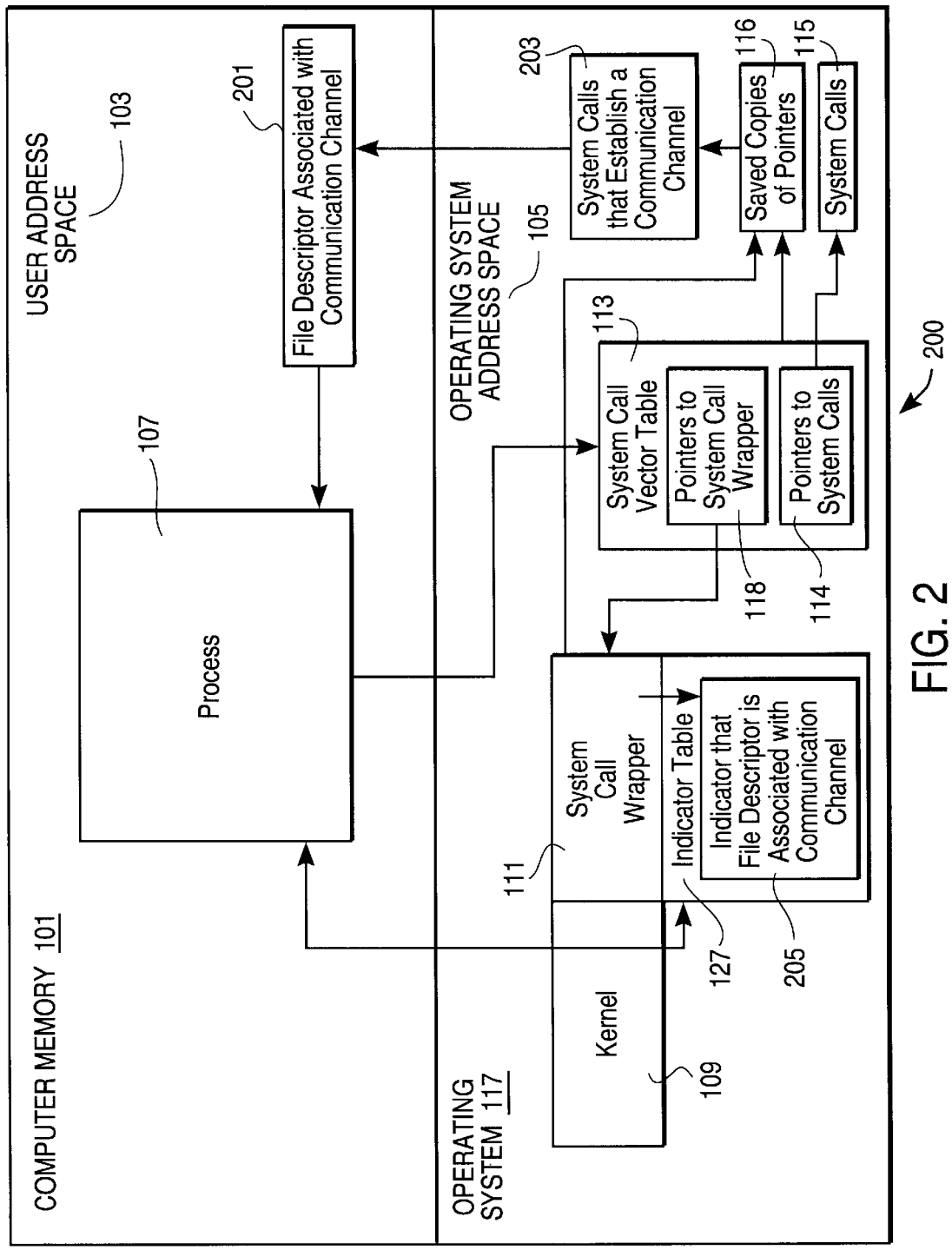
FIG. 2 is a block diagram illustrating a system for maintaining and utilizing an indicator table in order to disambiguate file descriptors that are associated with communication channels from those that are not, according to one embodiment of the present invention.

FIG. 2 illustrates a system 200 for maintaining and utilizing a table 127 of indicators 205 concerning communication channel file descriptors 201 in order to disambiguate file descriptors 201 that are associated with communication channels from file descriptors 102 that are not, according to one embodiment of the present invention.

It is to be understood that by the words "communication channel" it is meant a logical interface via which communication can be conducted. A communication channel is typically although not necessarily associated with both a network address and a port. Typically, separate communication channels must be present at each end of a communication session. A communication channel is sometimes denoted by the words "communication channel end" or "communication channel end point." Communication channels include but are not limited to sockets.

In the embodiment of FIG. 2, system calls that establish a communication channel 203 are intercepted. Examples of system calls that establish a communication channel 203 are the UNIX® socket function and the UNIX® accept function. It is to be understood that the names of the system calls that establish a communication channel 203 vary from operating system 117 to operating system 117. The present invention is not limited to any specific operating system 117, or to any specific system call name. Some operating systems 117 include a single system call that establishes a communication channel 203. Other operating systems 117 include more than one system call that establishes a communication channel 203.

To prepare to intercept system calls that establish a communication channel 203, internal operating system pointers 114 in the system call vector table 113 to such system calls 203 are copied. The copies of the pointers 116 may be stored in operating system address space 105 or in user address space 103, as desired. The pointers 114 in the system call vector table 113 to system calls that establish a communication channel 203 are replaced with pointers 118 to the system call wrapper 111, such that when the system calls 203 are made, the system call wrapper 111 is executed instead.

When a system call that establishes a communication channel 203 is made, the operating system 117 uses the pointer 118 in the system call vector table 113 to execute the system call wrapper 111. The system call wrapper 111 first utilizes the saved copy of the pointer 116 to the system call 203 to make the system call 203. The system call 203 executes, thereby establishing the communication channel. After having established the communication channel, the system call 203 returns a file descriptor that is associated with the established communication channel 201. This file descriptor 201 is to be used by processes 107 in order to access the established communication channel. After the system call 203 terminates, the system call wrapper 111 stores (in the indicator table 127) an indicator 205 that the file descriptor 201 returned by the system call 203 is associated with a communication channel.

In order to keep the indicator table 127 current, system calls 115 that create a copy of a file, a copy of a file descriptor 102, or a copy of an operating system file descriptor 102 table are also intercepted. It is to be understood that a system call 115 that copies a file also copies a file descriptor 102, because when a new file (the copy of the original file) is created, a new file descriptor 102 is also created, the new file descriptor 102 being associated with the new file.

To prepare to intercept system calls 115 that create a copy of a file, a copy of a file descriptor 102, or a copy of an operating system file descriptor 102 table, copies 116 are made of internal operating system pointers 114 in the system call vector table 113 to such system calls 115. The pointers 114 in the system call vector table 113 to these system calls 115 are replaced with pointers 118 to the system call wrapper 111, such that when the system calls 115 are made, the system call wrapper 111 is executed instead.

Whenever any process 107 makes a system call 115 to copy a file, the system call wrapper 111 executes. First, the system call wrapper 111 checks the indicator table 127 to determine whether the file descriptor 102 associated with the file to be copied is associated with a communication channel. If so, the copy of the file, and hence the copy of its associated file descriptor 201, will also be associated with a communication channel. The system call wrapper 111 utilizes the copy of the pointer 116 to execute the system call 115. The system call 115 executes and creates a copy of the file, and also a copy of its associated file descriptor 201 (in an alternative embodiment, the system call wrapper 111 creates the copies itself, rather than making the system call 115). After the system call 115 exits, the system call wrapper 111 stores an indicator 205 in the indicator table 127 that the file descriptor 201 associated with the copy of the file is associated with a communication channel. If the file to be copied is not associated with a communication channel, the system call wrapper 111 simply makes the system call 115 such that execution control returns to the calling process 107 after the system call 115 executes.

Some system calls 115 simply copy an existing file descriptor 102, without copying its associated file. These system calls 115 are also intercepted. When a communication channel file descriptor 201 is copied, the system call wrapper 111 stores an indicator 205 in the indicator table 127 that the copy of the file descriptor 201 is associated with a communication channel.

System calls 115 that copy an entire file descriptor 102 table are also intercepted. For each file descriptor 102 in the file descriptor 102 table, the system call wrapper 111 checks the indicator table 127 to determine whether the file descriptor 102 is associated with a communication channel. The system call wrapper 111 then utilizes the copy of the pointer 116 to execute the system call 115. The system call 115 executes and creates a copy of the file descriptor 102 table. After the system call 115 exits, the system call wrapper 111 stores, for each communication channel file descriptor 201 in the file descriptor 102 table, an indicator 205 that the created copy of the file descriptor 201 is associated with a communication channel.

In order to keep the indicator table 127 current, system calls 115 that delete a file descriptor 102 are also intercepted. Note that a system call 115 that deletes a file also deletes the associated descriptor 102 of the file. Thus, by the phrase "system calls 115 that delete a file descriptor 102," it is meant both system calls 115 that delete a file descriptor 102 only, and system calls 115 that delete a file and its associated descriptor 102.

Whenever a process 107 makes a system call 115 to delete a file descriptor 102, the system call wrapper 111 executes instead. The system call wrapper 111 checks the indicator table 127 to determine whether the file descriptor 102 to be deleted is associated with a communication channel. If so, the system call wrapper 111 utilizes the copy of the pointer 116 to execute the system call 115, which deletes the file descriptor 201 (in an alternative embodiment, the system call wrapper 111 deletes the file descriptor 201 itself, rather than making the system call 115). After the system call 115 exits, the system call wrapper 111 deletes the indicator 205 in the indicator table 127 that the file descriptor 201 is associated with a communication channel. This is appropriate, because the file descriptor 201 no longer exists. If the file descriptor 102 to be deleted is not associated with a communication channel, the system call wrapper 111 simply makes the system call 115 such that execution control returns to the calling process 107 after the system call 115 executes.

Thus, system calls that establish a communication channel 203 are intercepted. When these system calls 203 are made, the system call wrapper 111 executes and stores, in the indicator table 127, an indicator 205 that the file descriptor 201 of the established communication channel is a communication channel file descriptor 201. System calls 115 that copy or delete file descriptors 102 are also intercepted. If a file descriptor that is associated with a communication channel 201 is copied or deleted, the system call wrapper 111 updates the indicator table 127 appropriately. Thus, the indicator table 127 preferably includes an indicator 205 for every existing file descriptor that is associated with a communication channel 201.

Because the indicator table 127 includes indicators 205 for file descriptors that are associated with communication channels 201, the indicator table 127 can be utilized to determine whether or not a specific file descriptor 102 is associated with a communication channel. The indicator table 127 can be examined to determine if an indicator 205 concerning the specific file descriptor 102 is present. If so, the file descriptor 201 is associated with a communication channel. If no such indicator 205 is present, the file descriptor 102 is not associated with a communication channel.

In some operating systems 117, every file descriptor 102 is either associated with a file stored on media or with a communication channel. In embodiments of the present invention that execute under such operating systems 117, the indicator table 127 can be utilized to determine whether or not any specific file descriptor 102 is associated with a communication channel, and whether or not any specific file descriptor 102 is associated with a file stored on media. The indicator table 127 can be utilized to determine whether or not a file descriptor 102 is associated with a communication channel, as described above. Because file descriptors 102 that are not associated with communication channels are associated with files stored on media, the indicator table 127 can also be utilized to determine whether or not a specific file descriptor 102 is associated with a file stored on media. In order to so determine, the indicator table 127 is examined to determine if an indicator 205 concerning the specific file descriptor 102 is present. If not, the file descriptor 102 is associated with a file stored on media. If such an indicator 205 is present, the file descriptor 102 is not associated with a file stored on media.

III. Disambigiuating File Descriptors Concerning Files Stored on Media

Figure 3:
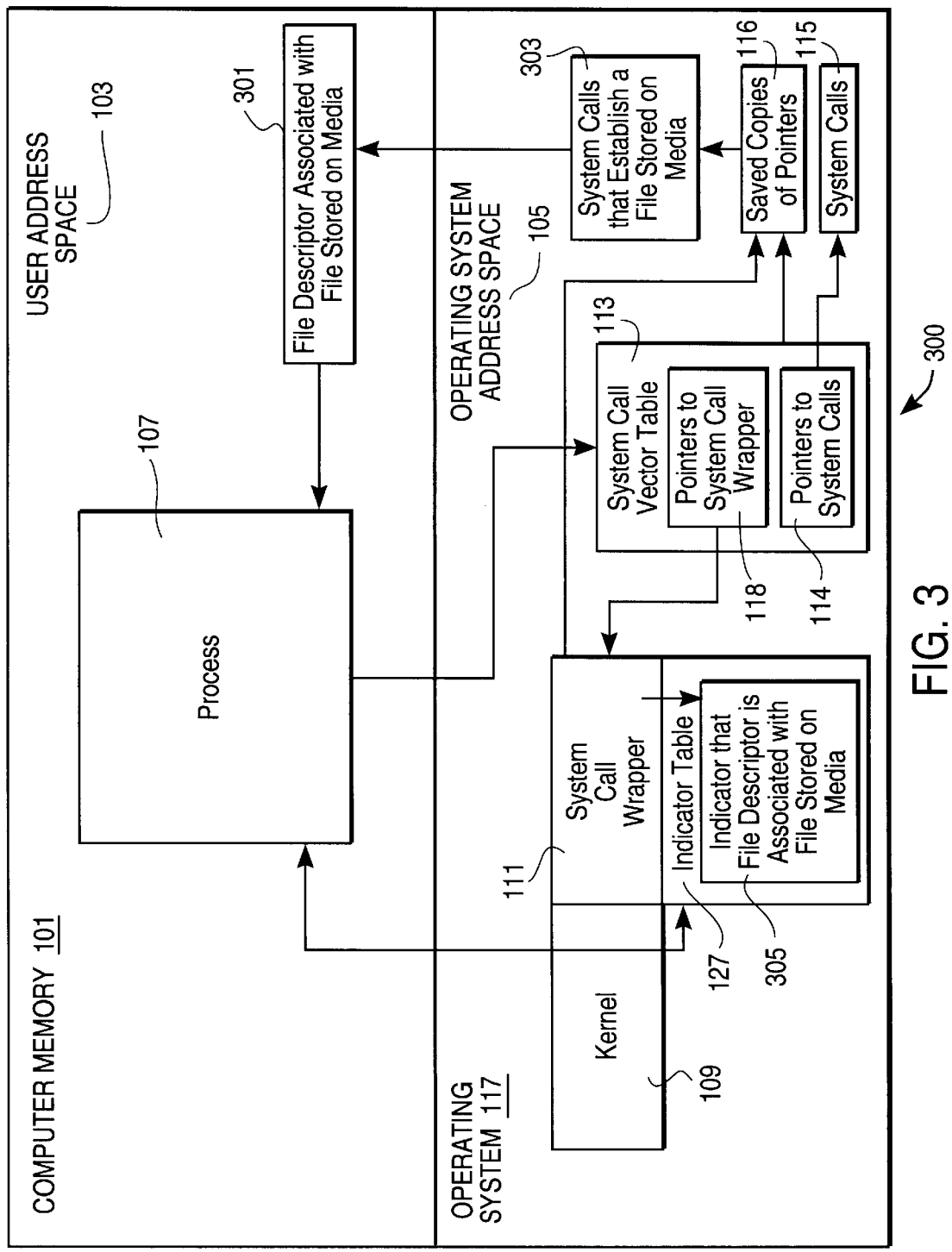
FIG. 3 is a block diagram illustrating a system for maintaining and utilizing an indicator table in order to disambiguate file descriptors that are associated with files stored one media from those that are not, according to one embodiment of the present invention.

FIG. 3 illustrates a system 300 for maintaining and utilizing a table 127 of indicators 305 concerning file descriptors that are associated with files stored on media 301 in order to disambiguate file descriptors that are associated with files stored on media 301 from file descriptors 102 that are not, according to one embodiment of the present invention.

In the embodiment of FIG. 3, system calls that establish a file stored on media 303 are intercepted. When a system call that establishes a file stored on media 303 is made, the operating system 117 uses the pointer 118 in the system call vector table 113 to execute the system call wrapper 111. The system call wrapper 111 first utilizes the saved copy of the pointer 116 to the system call 303 to make the system call 303. The system call 303 executes, thereby establishing the file stored on media. After having established the file stored on media, the system call 303 returns a file descriptor that is associated with the established file stored on media 301. This file descriptor 301 is to be used by processes 107 in order to access the established file stored on media.

After the system call 303 terminates, the system call wrapper 111 stores (in the indicator table 127) an indicator 305 that the file descriptor 301 returned by the system call 303 is associated with a file stored on media. Thus, whenever a system call that establishes a file stored on media 303 is made, the system call wrapper 111 executes and stores, in the indicator table 127, an indicator 305 that the file descriptor 301 of the established file stored on media is associated with a file stored on media.

In order to keep the indicator table 127 complete, system calls 115 that create a copy of a file, a copy of a file descriptor 102, or a copy of an operating system file descriptor 102 table are also intercepted, as in the embodiment of FIG. 2. Additionally, in order to keep the indicator table 127 current, system calls 115 that delete a file descriptor 102 are intercepted, as in the embodiment of FIG. 2. Thus, system calls 115 that copy or delete file descriptors 102 are intercepted. If a file descriptor that is associated with a file stored on media 301 is copied or deleted, the system call wrapper 111 updates the indicator table 127 appropriately. Therefore, the indicator table 127 preferably includes an indicator 305 for every existing file descriptor that is associated with a file stored on media 301.

Because the indicator table 127 includes an indicator 305 for file descriptors that are associated with files stored on media 301, the indicator table 127 can be utilized to determine whether or not a specific file descriptor 102 is associated with a file stored on media. The indicator table 127 can be examined to determine if an indicator 305 concerning the specific file descriptor 102 is present. If so, the file descriptor 301 is associated with a file stored on media. If no such indicator 305 is present, the filed descriptor 102 is not associated with a file stored on media.

As described above, in some operating systems 117, every file descriptor 102 is either associated with a file stored on media or with a communication channel. In embodiments of the present invention that execute under such operating systems 117, the indicator table 127 can be utilized to determine whether or not any specific file descriptor 102 is associated with a file stored on media, and whether or not any specific file descriptor 102 is associated with a communication channel. The indicator table 127 can be utilized to determine whether or not a file descriptor 102 is associated with a file stored on media, as described above. Because file descriptors 102 that are not associated with files stored on media are associated with communication channels, the indicator table 127 can also be utilized to determine whether or not a specific file descriptor 102 is associated with a communication channel. In order to so determine, the indicator table 127 is examined to determine if an indicator 305 concerning the specific file descriptor 102 is present. If not, the file descriptor 301 is associated with a communication channel. If such an indicator 305 is present, the file descriptor 102 is not associated with a communication channel.

It is to be understood that the present invention is not limited to utilizing indicators 205 concerning communication channel file descriptors 201 and indicators 305 concerning file descriptors associated with files stored on media 301 in order to disambiguate file descriptors 102. Other embodiments of the present invention utilize the above described steps to maintain indicator tables 127 including indicators concerning file descriptors 102 associated with other file types (for example, file descriptors 102 associated with hardware devices and file descriptors 102 associated with system resources). It is to be understood further that the term "file type" can be defined as broadly or narrowly as desired. Files that are stored on media are an example of a broad file type. Narrower file types include files stored on media in specific directories, files with a specific attribute such as read only, and even a specific file (a file type of one).

In these alternative embodiments, the respective indicator tables 127 are examined to determine whether or not specific file descriptors 102 are associated with specific file types. In other embodiments, an indicator table 127 including indicators 129 concerning multiple file types (or multiple indicator tables 127 each concerning one or more types) is (are) maintained and examined to disambiguate file descriptors 102. In some embodiments in which disambiguation concerns descriptors 102 of a narrow file type, when a system call 115 that establishes a file is intercepted, the system call wrapper 111 determines whether the established file is of the file type. For example, consider an embodiment in which file descriptors 102 that are associated with files stored on media in a specific directory are disambiguated from files descriptors that are associated with other files stored on media. All system calls that establish a file stored on media 303 are intercepted. The system call wrapper 111 determines if the file being established is to be stored in the specific directory. Only if so does the system call wrapper 111 store an indicator 129 that the file descriptor 102 is associated with the file type. System calls 115 that copy and delete file descriptors are also intercepted, and the table 127 is updated appropriately as files are copied to and deleted from the specific subdirectory.

IV. Selective Interception of System Calls that Access Files of a Specific Type

Figure 4:
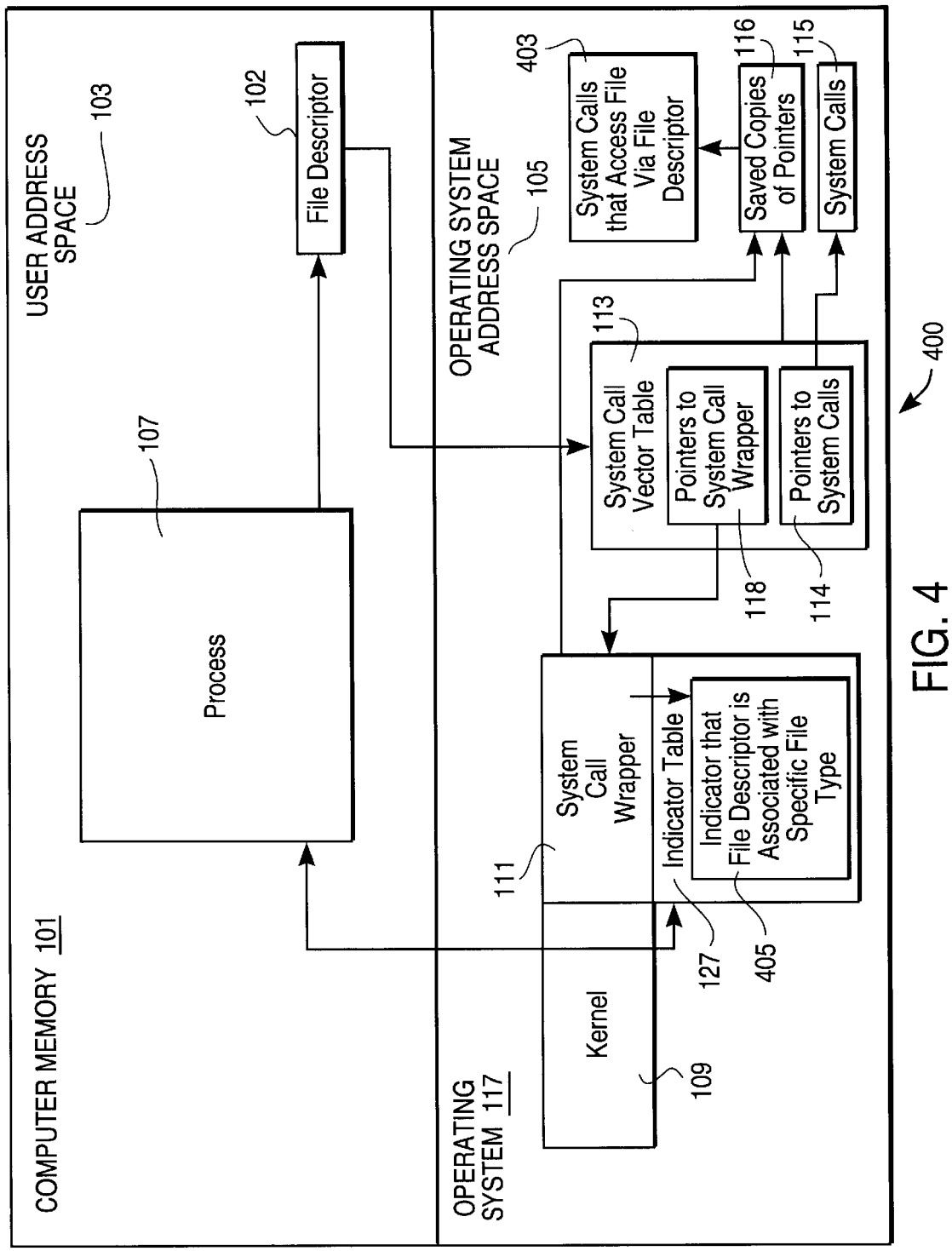
FIG. 4 is a block diagram illustrating a system for selectively intercepting system calls that access files of a specific type, according to one embodiment of the present invention.
Figure 5A:
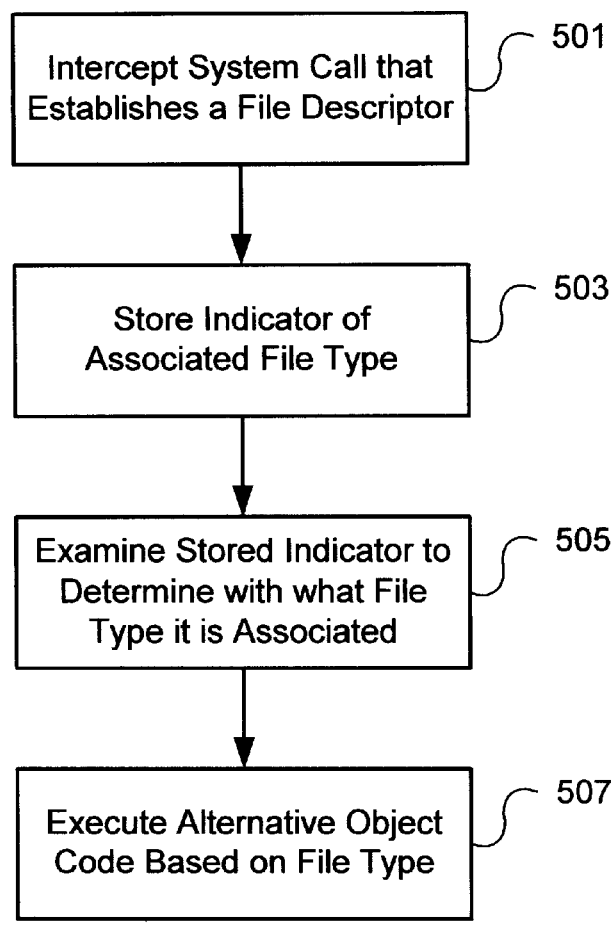
FIGS. 5A–B are flowcharts illustrating steps for performing an embodiment of the present invention.
Figure 5B:
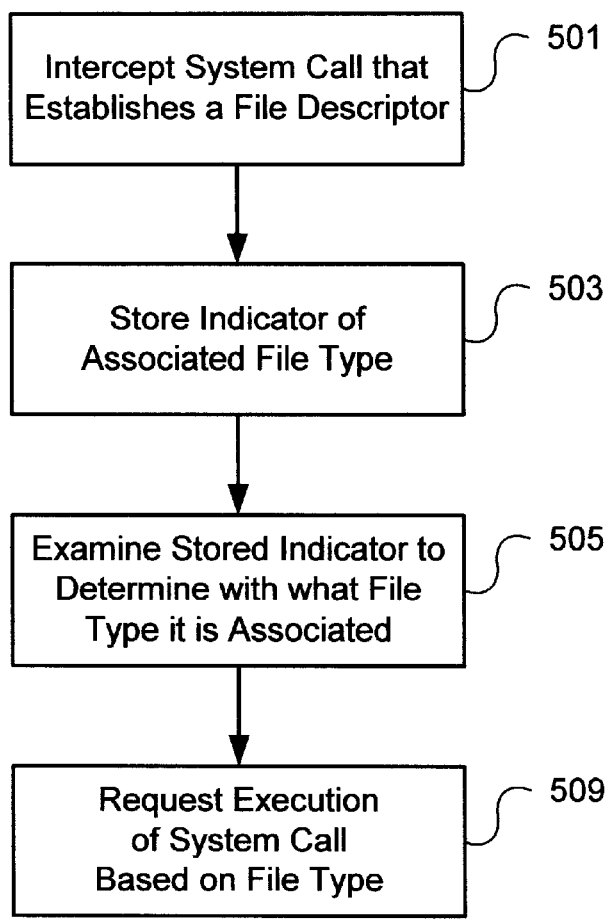
Figure 6A:
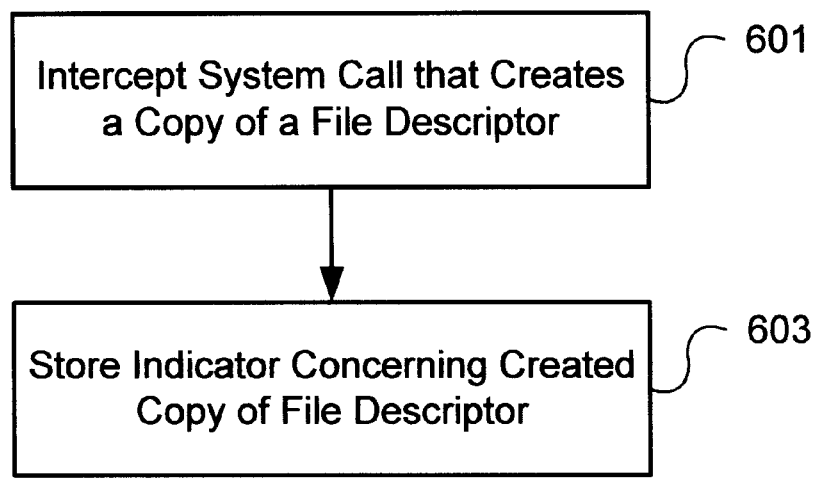
FIGS. 6A–B are flowcharts illustrating steps for performing another embodiment of the present invention.
Figure 6B:
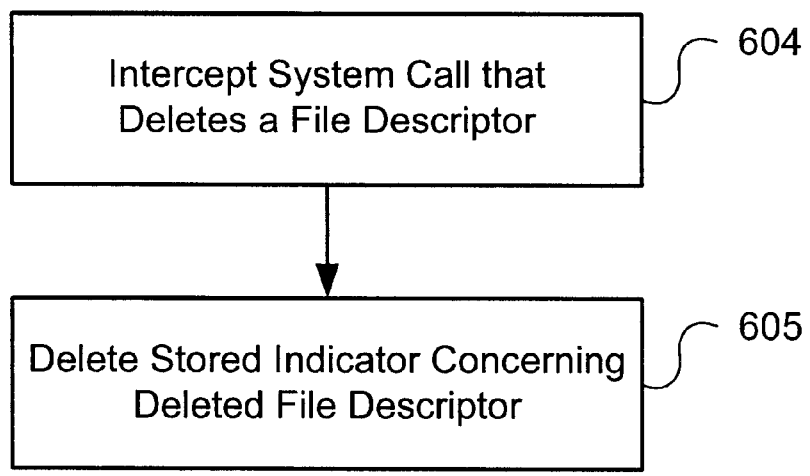
Figure 7A:
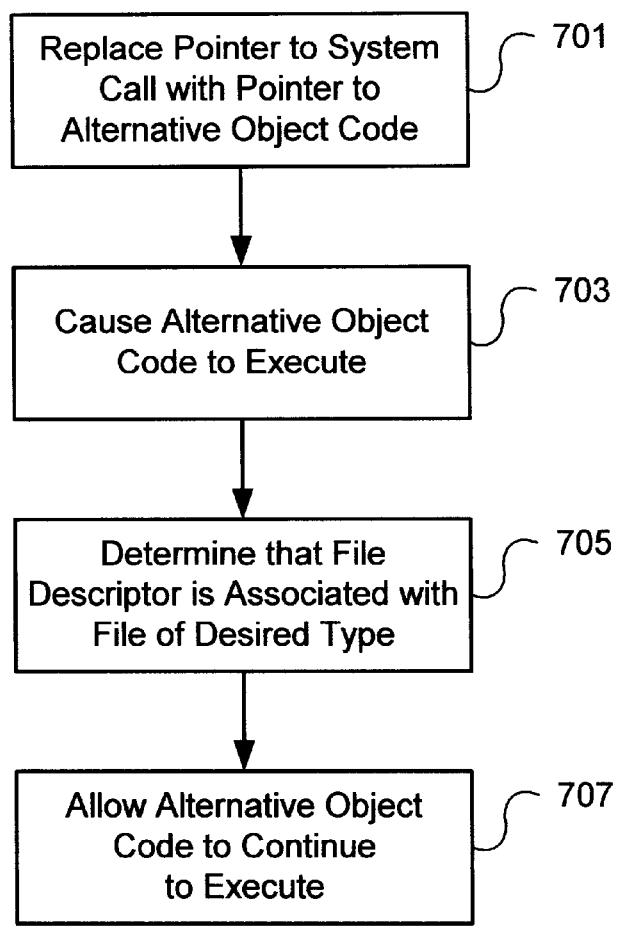
FIGS. 7A–D are flowcharts illustrating steps for performing another embodiment of the present invention.
Figure 7B:
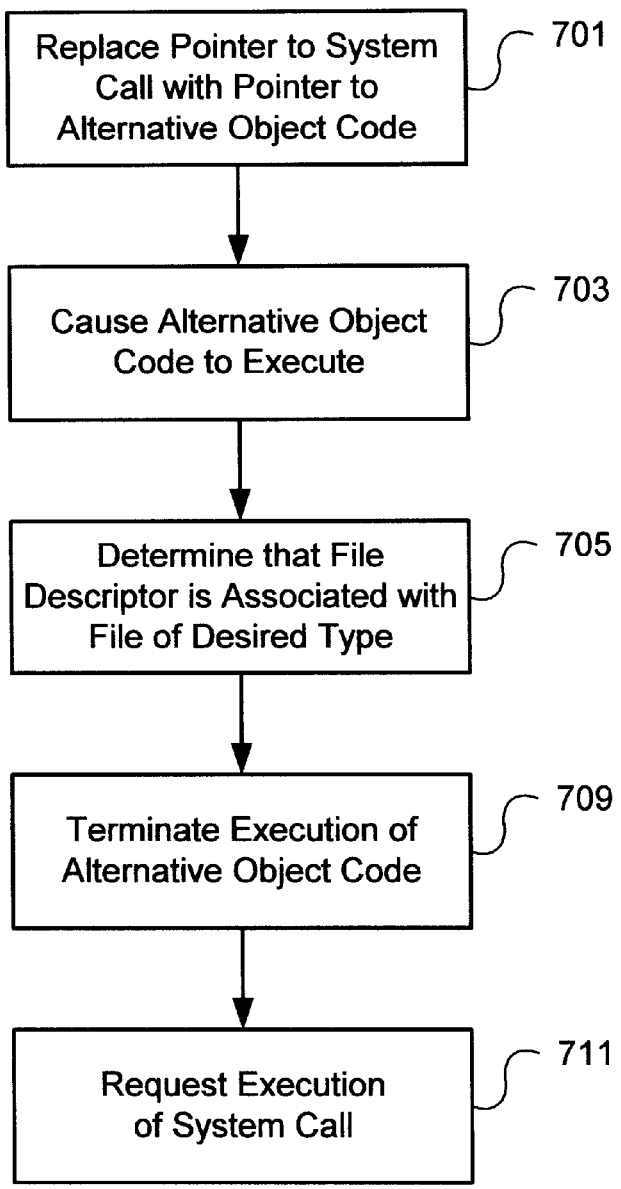
Figure 7C:
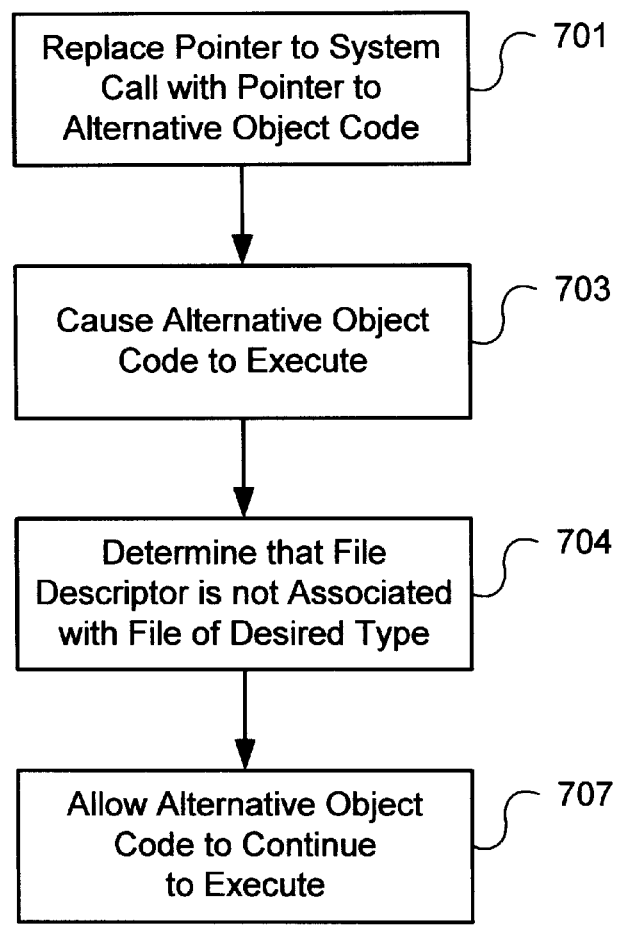
Figure 7D:
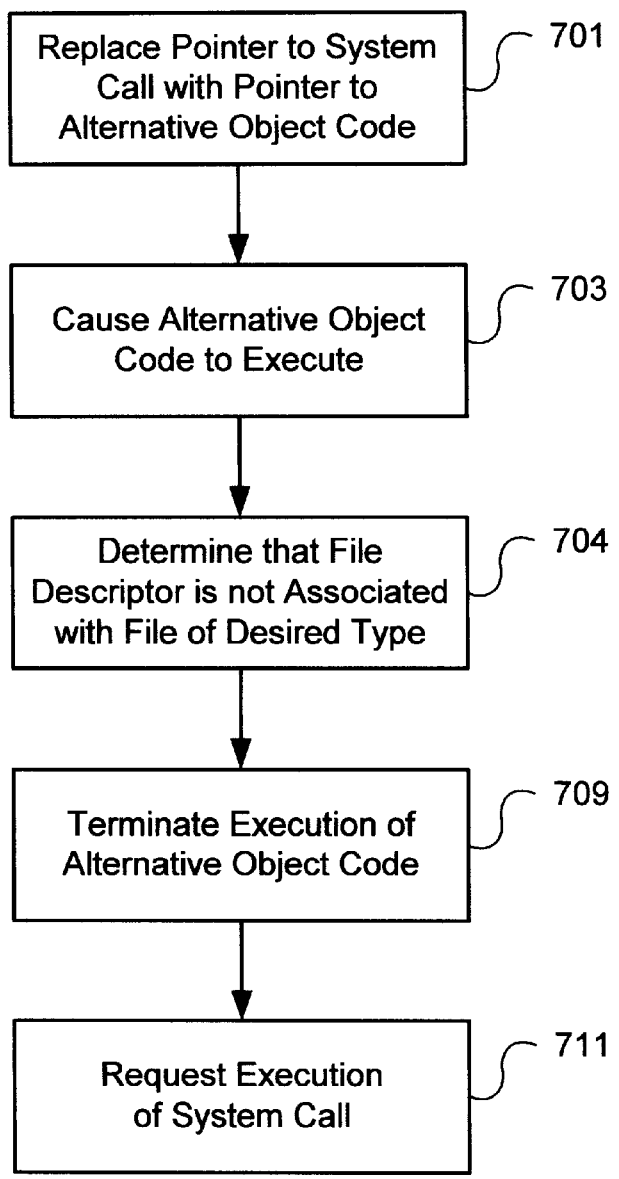
Figure 8A:
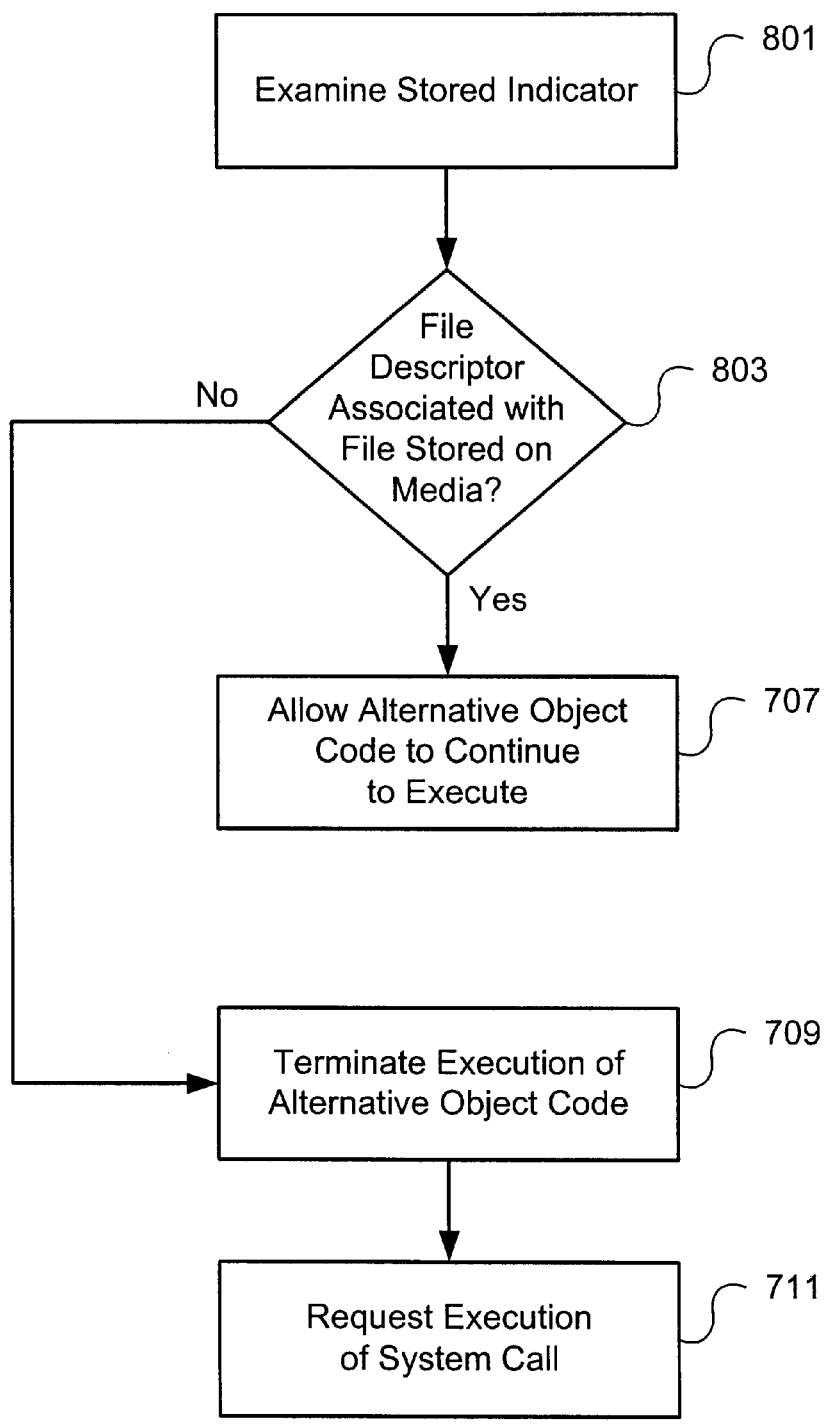
FIGS. 8A–D are flowcharts illustrating steps for performing another embodiment of the present invention.
Figure 8B:
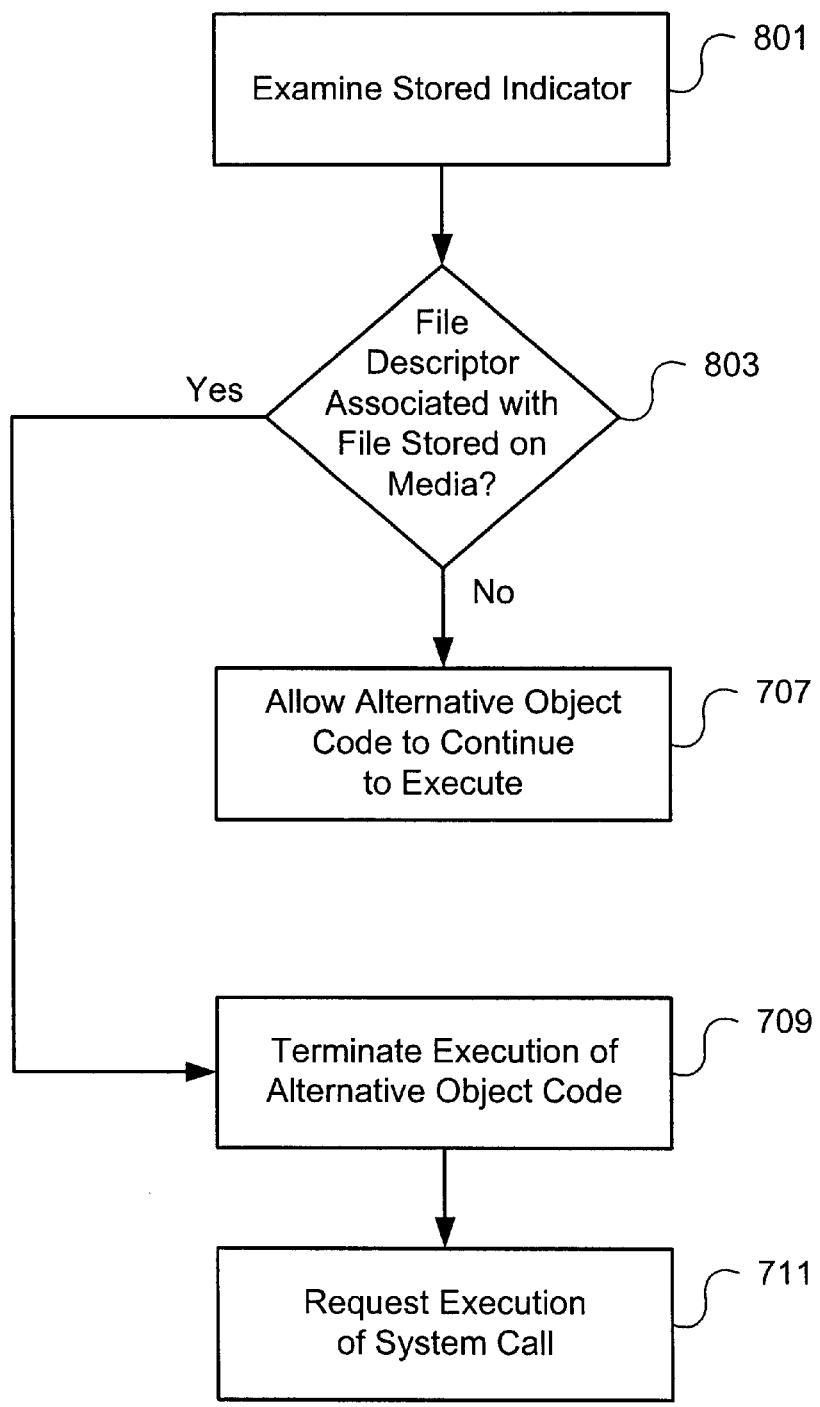
Figure 8C:
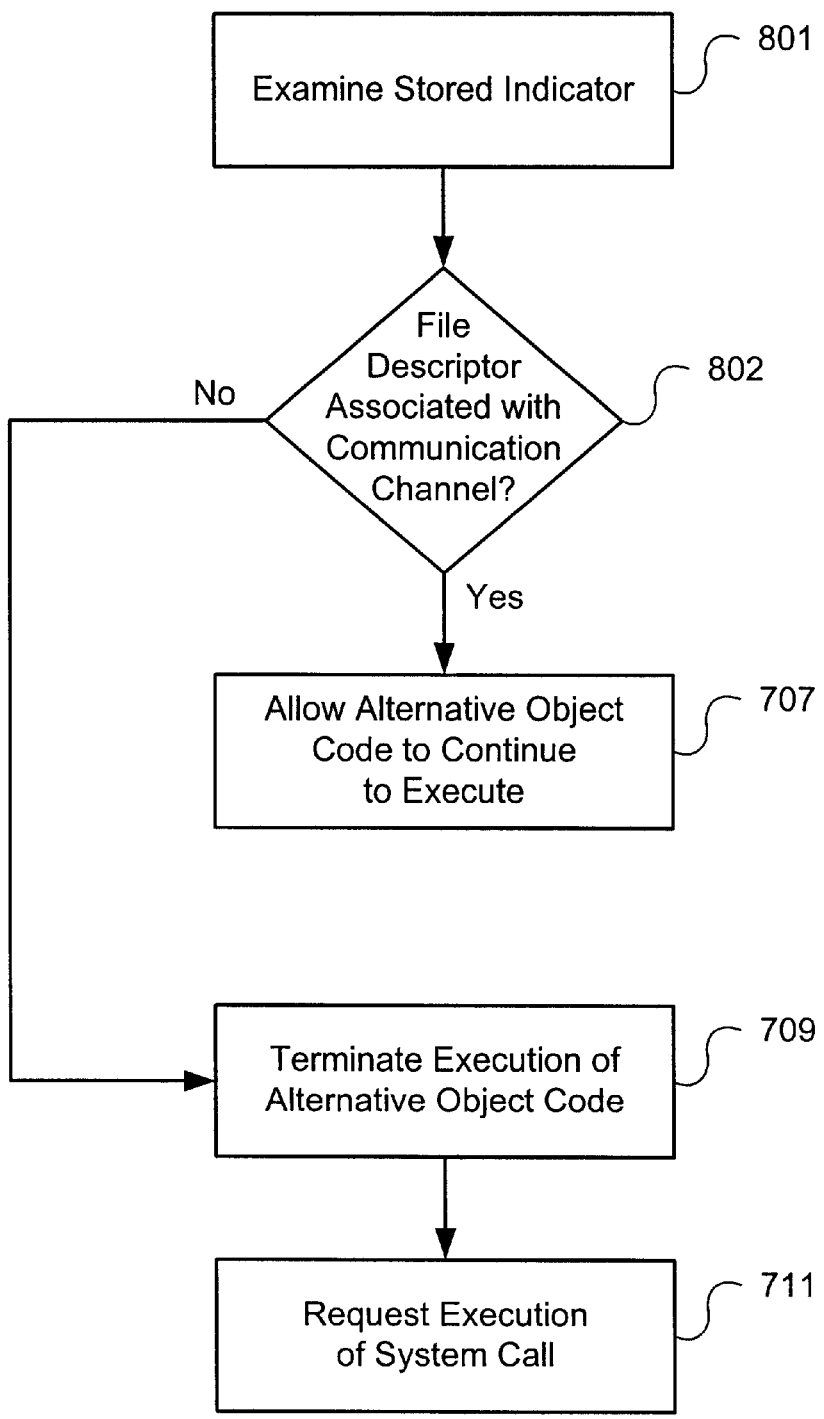
Figure 8D:
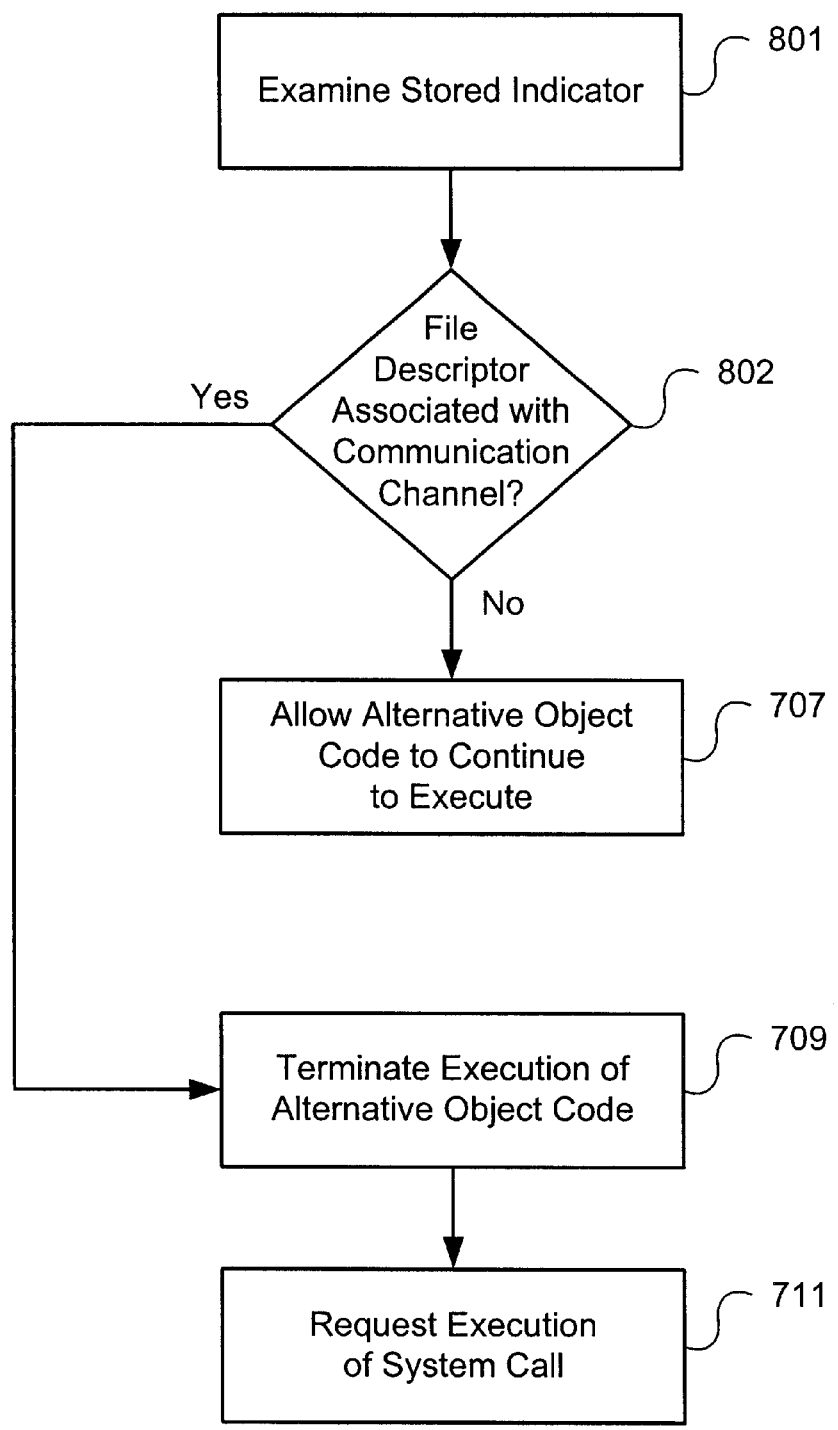

FIG. 4 illustrates a system 400 for utilizing an indicator table 127 to selectively intercept system calls 115 that access files of a specific type, according to one embodiment of the present invention. An indicator table 127 including indicators 405 concerning file descriptors 102 associated with the specific file type is maintained. In one embodiment the file type is communication channels. In another embodiment the file type is files stored on media. In yet another embodiment, the file type is hardware devices. Still other embodiments include other file types as desired. Regardless, system calls 115 that establish files of the specific file type are intercepted, and indicators 405 concerning file descriptors 102 associated with the specific file type are stored in the indicator table 127, in the manner described in the embodiment of FIG. 2 and in the embodiment of FIG. 3. In order to keep the indicator table 127 complete and current, system calls 115 that make a copy of a file descriptor 102 and that delete a file descriptor 102 are also intercepted in the manner described in the embodiment of FIG. 2 and in the embodiment of FIG. 3. Whenever a file descriptor 102 associated with the specific file type is copied or deleted, the indicator table is updated appropriately. Thus, the indicator table 127 preferably includes an indicator 405 for every file descriptor 102 associated with the specific file type.

The indicator table 127 is then used to facilitate selective interception of system calls 115 that access a file of the specific file type. System calls that access a file via a file descriptor 403 are intercepted. Examples of system calls that access a file via a file descriptor 403 are the UNIX® read function and the UNIX® write function. It is to be understood that the names of the system calls that access a file via a file descriptor 403 can vary from operating system 117 to operating system 117. The present invention is not limited to any specific operating system 117, or to any specific system call name.

To prepare to intercept system calls that access a file via a file descriptor 403, a copy 116 is made of internal operating system pointers 114 in the system call vector table 113 to such system calls 403. The pointers 114 in the system call vector table 113 to system calls that access a file via a file descriptor 403 are replaced with pointers 118 to the system call wrapper 111, such that when the system calls 403 are made, the system call wrapper 111 is executed instead.

When a system call that accesses a file via a file descriptor 403 is made, the operating system 117 uses the pointer 118 in the system call vector table 113 to execute the system call wrapper 111. The system call wrapper 111 examines the indicator table 127 to determine whether or not the file descriptor 102 is associated with the specific file type. If the file descriptor 102 is associated with the specific file type, the system call wrapper 115 continues to execute. If the file descriptor 102 is not associated with the specific file type, the system call 115 utilizes the saved copy of the pointer 116 to the system call 403 to make the system call 403, such that when the system call 403 finishes executing, execution control returns to the calling process 107.

Thus, system calls that access a file via a file descriptor 403 are selectively intercepted based on the file type. For example, suppose it is desirable only to intercept system calls that access communication channels 203, but not to intercept system calls that access files stored on media 303. When a system call that accesses a file via a file descriptor 403 is made (for example, a call to the read function), the system call wrapper 111 executes and examines the indicator table 127 to determine whether the file descriptor 102 that the system call 403 is attempting to access is associated with a communication channel. If so, the system call wrapper 111 proceeds to execute as desired. If the file descriptor 102 is not associated with a communication channel, the system call wrapper 111 makes the system call 115, such that execution control is returned to the calling process after the system call 115 terminates. Of course, the present invention can also be used to selectively intercept system calls that access files stored on media, as well as any other specific file type.

In summary, the present invention facilitates the disambiguation of file descriptors associated with any file type. Such disambiguation of file descriptors allows the selective interception of system calls that access files of any specific file type via a file descriptor.

The execution of steps for performing various above described embodiments of the present invention are further illustrated by FIGS. 5A–8D.

What is claimed is:

1. A method in a computer system for disambiguating file descriptors, the method comprising:

intercepting system calls that establish a file descriptor;

storing at least one indicator of a file type associated with an established file descriptor;

intercepting system calls that create a copy of at least one file descriptor;

storing at least one indicator concerning a created copy of a file descriptor; and upon an attempt to access a file via a file descriptor, examining at least one stored indicator to determine with what file type the file descriptor is associated.

2. The method of claim 1 wherein intercepting a system call that creates a copy of at least one file descriptor comprises:

intercepting a system call that creates a copy of a file descriptor table.

3. A method in a computer system for disambiguating file descriptors, the method comprising:

intercepting system calls that establish a communication channel;

storing at least one indicator that a file descriptor established by an intercepted system call is associated with a communication channel;

intercepting system calls that utilize a file descriptor to access a file, wherein intercepting a system call that utilizes a file descriptor to access a file comprises replacing a pointer to the system call with a pointer to alternative object code, such that making the system call causes the alternative object code to execute;

examining at least one stored indicator to determine with what file type the file descriptor of an intercepted system is associated; and in response to a determination that the file descriptor is associated with a file stored on media, performing one of:
1) allowing the alternative object code to continue to execute; or
2) terminating execution of the alternative object code, and requesting execution of the system call.

4. A method in a computer system for disambiguating file descriptors, the method comprising:

intercepting system calls that establish a communication channel;

storing at least one indicator that a file descriptor established by an intercepted system call is associated with a communication channel;

intercepting system calls that utilize a file descriptor to access a file, wherein intercepting a system call that utilizes a file descriptor to access a file comprises replacing a pointer to the system call with a pointer to alternative object code, such that making the system call causes the alternative object code to execute;

examining at least one stored indicator to determine with what file type the file descriptor of an intercepted system is associated; and in response to a determination that the file descriptor is not associated with a communication channel, performing one of:
1) allowing the alternative object code to continue to execute; or
2) terminating execution of the alternative object code, and requesting execution of the system call.

5. A method in a computer system for disambiguating file descriptors, the method comprising:

intercepting system calls that establish a communication channel;

storing at least one indicator that a file descriptor established by an intercepted system call is associated with a communication channel;

intercepting system calls that create a copy of at least one file descriptor;

storing at least one indicator concerning a created copy of a file descriptor; and examining at least one stored indicator to determine with what file type a file descriptor is associated.

6. The method of claim 5 further comprising:

where a copied file descriptor is associated with a communication channel, storing an indicator that a created copy of the file descriptor is associated with a communication channel.

7. The method of claim 5 wherein:

intercepting a system call that creates a copy of at least one file descriptor comprises intercepting a system call that creates a copy of a file descriptor table.

8. A method in a computer system for disambiguating file descriptors, the method comprising:

intercepting system calls that establish a file stored on media;

storing at least one indicator that a file descriptor established by an intercepted system call is associated with a file stored on media, wherein storing an indicator that an established file descriptor is associated with a file stored on media further comprises storing the indicator in a table; and examining at least one stored indicator to determine with what file type a file descriptor is associated.

9. A method in a computer system for disambiguating file descriptors, the method comprising:

intercepting system calls that establish a file stored on media;

storing at least one indicator that a file descriptor established by an intercepted system call is associated with a file stored on media; and examining at least one stored indicator to determine with what file type a file descriptor is associated, wherein examining comprises, intercepting system calls that utilize a file descriptor to access a file, and examining at least one stored indicator to determine with what file type the file descriptor of an intercepted system call is associated, wherein intercepting a system call that utilizes a file descriptor to access a file comprises replacing a pointer to the system call with a pointer to alternative object code, such that making the system call causes the alternative object code to execute; and in response to a determination that the file descriptor is associated with a file stored on media, performing one of:
1) allowing the alternative object code to continue to execute; or
2) terminating execution of the alternative object code, and requesting execution of the system call.

10. A method in a computer system for disambiguating file descriptors, the method comprising:

intercepting system calls that establish a file stored on media;

storing at least one indicator that a file descriptor established by an intercepted system call is associated with a file stored on media;

intercepting system calls that utilize a file descriptor to access a file, wherein intercepting a system call that utilizes a file descriptor to access a file comprises replacing a pointer to the system call with a pointer to alternative object code, such that making the system call causes the alternative object code to execute;

examining at least one stored indicator to determine with what file type the file descriptor of an intercepted system call is associated; and in response to a determination that the file descriptor is not associated with a communication channel, performing one of:
1) allowing the alternative object code to continue to execute; or
2) terminating execution of the alternative object code, and requesting execution of the system call.

11. A method in a computer system for disambiguating file descriptors, the method comprising:

intercepting system calls that establish a file stored on media;

intercepting system calls that create a copy of at least one file descriptor;

storing at least one indicator that a file descriptor established by an intercepted system call is associated with a file stored on media;

storing at least one indicator concerning a created copy of a file descriptor; and examining at least one stored indicator to determine with what file type a file descriptor is associated.

12. The method of claim 11 further comprising:

where a copied file descriptor is associated with a communication channel, storing an indicator that a created copy of the file descriptor is associated with a communication channel.

13. The method of claim 11 wherein:

intercepting a system call that creates a copy of at least one file descriptor comprises intercepting a system call that creates a copy of a file descriptor table.

14. A computer program product for disambiguating file descriptors, the computer program product comprising:

program code for intercepting system calls that establish a file descriptor;

program code for storing at least one indicator of a file type associated with an established file descriptor;

program code for, upon an attempt to access a file via a file descriptor, examining at least one stored indicator to determine with what file type the file descriptor is associated;

program code for intercepting system calls that create a copy of at least one file descriptor;

program code for storing at least one indicator concerning a created copy of a file descriptor; and a computer readable medium on which the program codes are stored.

15. A computer program product for disambiguating file descriptors, the computer program product comprising:

program code for intercepting system calls that establish a communication channel;

program code for storing at least one indicator that a file descriptor established by an intercepted system call is associated with a communication channel;

program code for examining at least one stored indicator to determine with what file type a file descriptor is associated;

program code for intercepting system calls that utilize a file descriptor to access a file;

program code for examining at least one stored indicator to determine with what file type the file descriptor of an intercepted system is associated;

program code for replacing a pointer to the system call with a pointer to alternative object code, such that making the system call causes the alternative object code to execute;

program code for, in response to a determination that the file descriptor is associated with a file stored on media, performing one of:

1) allowing the alternative object code to continue to execute; or 2) terminating execution of the alternative object code, and requesting execution of the system call; and a computer readable medium on which the program codes are stored.

16. A computer program product for disambiguating file descriptors, the computer program product comprising:

program code for intercepting system calls that establish a communication channel;

program code for storing at least one indicator that a file descriptor established by an intercepted system call is associated with a communication channel;

program code for examining at least one stored indicator to determine with what file type a file descriptor is associated;

program code for intercepting system calls that utilize a file descriptor to access a file;

program code for examining at least one stored indicator to determine with what file type the file descriptor of an intercepted system is associated;

program code for replacing a pointer to the system call with a pointer to alternative object code, such that making the system call causes the alternative object code to execute;

program code for, in response to a determination that the file descriptor is not associated with a communication channel, performing one of:

1) allowing the alternative object code to continue to execute; or 2) terminating execution of the alternative object code, and requesting execution of the system call; and a computer readable medium on which the program codes are stored.

17. A computer program product for disambiguating file descriptors, the computer program product comprising:

program code for intercepting system calls that establish a communication channel;

program code for storing at least one indicator that a file descriptor established by an intercepted system call is associated with a communication channel;

program code for examining at least one stored indicator to determine with what file type a file descriptor is associated;

program code for, intercepting system calls that create a copy of at least one file descriptor;

program code for storing at least one indicator concerning a created copy of a file descriptor; and a computer readable medium on which the program codes are stored.

18. The computer program product of claim 17 further comprising:

program code for, where a copied file descriptor is associated with a communication channel, storing an indicator that a created copy of the file descriptor is associated with a communication channel.

19. A computer program product for disambiguating file descriptors, the computer program product comprising:

program code for intercepting system calls that establish a file stored on media;

program code for storing at least one indicator that a file descriptor established by an intercepted system call is associated with a file stored on media;

program code for examining at least one stored indicator to determine with what file type a file descriptor is associated;

program code for intercepting system calls that utilize a file descriptor to access a file;

program code for examining at least one stored indicator to determine with what file type the file descriptor of an intercepted system call is associated;

program code for replacing a pointer to the system call with a pointer to alternative object code, such that making the system call causes the alternative object code to execute;

program code for, in response to a determination that the file descriptor is associated with a file stored on media, performing one of:
1) allowing the alternative object code to continue to execute; or
2) terminating execution of the alternative object code, and requesting execution of the system call; and a computer readable medium on which the program codes are stored.

20. A computer program product for disambiguating file descriptors, the computer program product comprising:

program code for intercepting system calls that establish a file stored on media;

program code for storing at least one indicator that a file descriptor established by an intercepted system call is associated with a file stored on media;

program code for examining at least one stored indicator to determine with what file type a file descriptor is associated;

program code for intercepting system calls that utilize a file descriptor to access a file;

program code for examining at least one stored indicator to determine with what file type the file descriptor of an intercepted system call is associated;

program code for replacing a pointer to the system call with a pointer to alternative object code, such that making the system call causes the alternative object code to execute;

program code for, in response to a determination that the file descriptor is not associated with a communication channel, performing one of:
1) allowing the alternative object code to continue to execute; or
2) terminating execution of the alternative object code, and requesting execution of the system call; and a computer readable medium on which the program codes are stored.

21. A computer program product for disambiguating file descriptors, the computer program product comprising:

program code for intercepting system calls that establish a file stored on media;

program code for storing at least one indicator that a file descriptor established by an intercepted system call is associated with a file stored on media;

program code for examining at least one stored indicator to determine with what file type a file descriptor is associated;

program code for intercepting system calls that create a copy of at least one file descriptor;

program code for storing at least one indicator concerning a created copy of a file descriptor; and a computer readable medium on which the program codes are stored.

* * * * *

UNITED STATES PATENT AND TRADEMARK OFFICE
CERTIFICATE OF CORRECTION

PATENT NO. : 6,560,613 B1 Page 1 of 1
DATED : May 6, 2003
INVENTOR(S) : Snorri Gylfason, Xun Wilson Huang and Rosen Sharma It is certified that error appears in the above-identified patent and that said Letters Patent is hereby corrected as shown below:

<u>Title page,</u>
Item [56], OTHER PUBLICATIONS, please delete the duplicate listing of "Rusling, D. A., Linux Processes, [online], [retrieved on Dec. 7, 1999]. Retrieved from the Internet: <URL: http://www.cebaf.gov/~saw/linux/tlk-html/node45.html>" and replace with -- Rusling, D. A., Indentifiers, [online], [retrieved on Dec. 7, 1999]. Retrieved from the Internet: <URL: http://www.cebaf.gov/~saw/linux/tlk-html/node46.html> --

Signed and Sealed this

Twenty-sixth Day of August, 2003

JAMES E. ROGAN
*Director of the United States Patent and Trademark Office*